US011572775B2

(12) United States Patent
Mao et al.

(10) Patent No.: US 11,572,775 B2
(45) Date of Patent: Feb. 7, 2023

(54) OPERATION METHOD OF A TURBINE FRACTURING DEVICE AND A TURBINE FRACTURING DEVICE

(71) Applicant: YANTAI JEREH PETROLEUM EQUIPMENT & TECHNOLOGIES CO., LTD., Shandong (CN)

(72) Inventors: Zhuqing Mao, Shandong (CN); Rikui Zhang, Shandong (CN); Peng Zhang, Shandong (CN); Jianwei Wang, Shandong (CN); Jihua Wang, Shandong (CN); Xiaolei Ji, Shandong (CN); Xincheng Li, Shandong (CN); Yuxuan Sun, Shandong (CN); Yipeng Wu, Shandong (CN); Chunqiang Lan, Shandong (CN); Liang Lv, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/896,361

(22) Filed: Aug. 26, 2022

(65) Prior Publication Data

US 2022/0412199 A1 Dec. 29, 2022

Related U.S. Application Data

(63) Continuation of application No. 17/485,014, filed on Sep. 24, 2021, which is a continuation-in-part of (Continued)

(30) Foreign Application Priority Data

Jan. 26, 2021 (CN) .......................... 202110101567.8
Jun. 1, 2021 (CN) .......................... 202110608526.8

(51) Int. Cl.
*E21B 43/26* (2006.01)
*F04B 49/02* (2006.01)
(Continued)

(52) U.S. Cl.
CPC .......... *E21B 43/2607* (2020.05); *F01D 15/08* (2013.01); *F01D 15/12* (2013.01); (Continued)

(58) Field of Classification Search
CPC ...... E21B 43/26; E21B 43/2607; F01D 15/08; F04B 49/02
See application file for complete search history.

(56) References Cited

U.S. PATENT DOCUMENTS 10,407,990 B2  9/2019  Oehring et al.
10,865,624 B1  12/2020  Cui et al.
(Continued)

FOREIGN PATENT DOCUMENTS

CN  102287360 A  12/2011
CN  207752603 U  8/2018
(Continued)

*Primary Examiner* — Shane Bomar
(74) *Attorney, Agent, or Firm* — Crowell & Moring LLP

(57) ABSTRACT

An operation method of a turbine fracturing device and a turbine fracturing device are provided. The turbine fracturing device includes a turbine engine, a speed reducer, a brake mechanism, and a fracturing pump, the method includes: driving, by the turbine engine, the fracturing pump to perform a fracturing operation through the speed reducer so as to keep the fracturing pump in an operating state, the fracturing pump being configured to suck fluid of a first pressure and discharge fluid of a second pressure, the second pressure being greater than the first pressure; and in response to an idling instruction, the turbine engine entering an idling state and triggering a brake operation so as to keep the fracturing pump in a non-operating state.

20 Claims, 10 Drawing Sheets

Related U.S. Application Data application No. 17/172,819, filed on Feb. 10, 2021, now Pat. No. 11,143,006.

(51) Int. Cl.

| | | |
|---|---|---|
| *F01D 15/08* | (2006.01) | |
| *F04B 17/05* | (2006.01) | |
| *F04B 49/06* | (2006.01) | |
| *F01D 15/12* | (2006.01) | |

(52) U.S. Cl.
 CPC .............. *F04B 17/05* (2013.01); *F04B 49/02* (2013.01); *F04B 49/065* (2013.01)

(56) References Cited

U.S. PATENT DOCUMENTS

| | | | |
|---|---|---|---|
| 10,865,631 | B1 | 12/2020 | Zhang et al. |
| 10,954,855 | B1 | 3/2021 | Ji et al. |
| 10,961,993 | B1 | 3/2021 | Ji et al. |
| 11,143,006 | B1 | 10/2021 | Zhang et al. |
| 11,242,737 | B2 * | 2/2022 | Zhang ................... F01D 25/285 |
| 11,255,173 | B2 * | 2/2022 | Coli .................... E21B 43/2607 |
| 11,359,462 | B2 * | 6/2022 | Morris ................... E21B 43/26 |
| 11,391,136 | B2 * | 7/2022 | Coli .......................... F04B 1/16 |
| 11,408,417 | B1 * | 8/2022 | Stephenson ......... E21B 43/2607 |
| 2014/0048268 | A1 | 2/2014 | Chandler |
| 2018/0266412 | A1 | 9/2018 | Stokkevåg et al. |
| 2020/0109616 | A1 * | 4/2020 | Oehring .................... F04B 1/00 |
| 2020/0206651 | A1 | 7/2020 | Frick |
| 2020/0332784 | A1 | 10/2020 | Zhang et al. |
| 2020/0400005 | A1 | 12/2020 | Han et al. |
| 2021/0071579 | A1 | 3/2021 | Li et al. |
| 2021/0086851 | A1 | 3/2021 | Zhang et al. |
| 2021/0087883 | A1 | 3/2021 | Zhang et al. |
| 2021/0087916 | A1 | 3/2021 | Zhang et al. |
| 2021/0088042 | A1 | 3/2021 | Zhang et al. |
| 2021/0396122 | A1 * | 12/2021 | Yeung ..................... F02C 7/268 |
| 2022/0127944 | A1 * | 4/2022 | Chapman ................. F02C 6/00 |
| 2022/0235640 | A1 | 7/2022 | Mao et al. |

FOREIGN PATENT DOCUMENTS

| | | |
|---|---|---|
| CN | 110005085 A | 7/2019 |
| CN | 110469654 A | 11/2019 |
| CN | 110485983 A | 11/2019 |
| CN | 112780245 A | 5/2021 |

\* cited by examiner

OPERATION METHOD OF A TURBINE FRACTURING DEVICE AND A TURBINE FRACTURING DEVICE

This application is a continuation application of and claim the benefit of priority to U.S. patent application Ser. No. 17/485,014, filed on Sep. 24, 2021, which is a continuation-in-part application of and claims the benefit of priority to U.S. patent application Ser. No. 17/172,819 filed on Feb. 10, 2021 which claims priority to Chinese Patent Application No. 202110101567.8, filed on Jan. 26, 2021, and Chinese patent application No. 202110608526.8 filed on Jun. 1, 2021. These prior patent applications are incorporated herein by reference as part of this application in their entireties.

TECHNICAL FIELD

At least one embodiment of the present disclosure relates to an operation method of a turbine fracturing device and a turbine fracturing device.

BACKGROUND

The principle of a turbine fracturing device is that a turbine engine is connected with a reduction gearbox directly and connected with a fracturing pump through the reduction gearbox to drive the fracturing pump. For example, the fracturing pump includes a piston pump.

SUMMARY

At least one embodiment of the present disclosure provides an operation method of a turbine fracturing device and a turbine fracturing device.

At least one embodiment of the present disclosure provides an operation method of a turbine fracturing device, the turbine fracturing device including a turbine engine, a speed reducer, a brake mechanism, and a fracturing pump, the method including: driving, by the turbine engine, the fracturing pump to perform a fracturing operation through the speed reducer so as to keep the fracturing pump in an operating state, the fracturing pump being configured to suck fluid of a first pressure and discharge fluid of a second pressure, the second pressure being greater than the first pressure; and in response to an idling instruction, the turbine engine entering an idling state and triggering a brake operation so as to keep the fracturing pump in a non-operating state.

For example, the operation method of the turbine fracturing device further includes: triggering an overpressure instruction in the case where a pressure of the fluid of the second pressure discharged by the fracturing pump is greater than an overpressure protection value, the overpressure instruction triggers the idling instruction.

For example, the operation method of the turbine fracturing device further includes: starting the turbine engine in response to a start instruction before the fracturing pump is in the operating state, the start instruction triggers the idling instruction, so that the turbine engine is in the idling state during a start process of the turbine engine.

For example, the operation method of the turbine fracturing device further includes: terminating the operating state of the fracturing pump in response to an operation termination instruction when the fracturing pump is in the operating state, the operation termination instruction triggers the idling instruction.

For example, the operation termination instruction is inputted manually to terminate the operating state of the fracturing pump.

For example, the operation termination instruction is triggered by an alarm protection program to terminate the operating state of the fracturing pump, and the alarm protection program includes triggering the operation termination instruction in at least one of the cases where a pressure of a lubricating oil of the fracturing pump is less than a first predetermined value, a temperature of the lubricating oil of the fracturing pump is greater than a second predetermined value, and a pressure of a lubricating oil of the speed reducer is less than a third predetermined value.

For example, the operation method of the turbine fracturing device further includes: stopping the operation of the fracturing pump in response to an emergency stop instruction, the emergency stop instruction triggers the idling instruction, the emergency stop instruction is triggered by an emergency stop protection program, and the emergency stop protection program includes triggering the emergency stop instruction in at least one of the cases where a pressure of a lubricating oil of the turbine engine is less than a fourth predetermined value, a vibration amplitude of the turbine engine is greater than a fifth predetermined value, and an exhaust temperature of the turbine engine is greater than a sixth predetermined value.

For example, the operation method of the turbine fracturing device further includes: stopping the operation of the fracturing pump in response to an emergency stop instruction, the emergency stop instruction triggers the idling instruction, the emergency stop instruction is triggered by manually judging emergencies to trigger the emergency stop instruction on the premise that an emergency stop protection program is not triggered.

For example, the operation method of the turbine fracturing device further includes: stopping the operation in response to a stop instruction and stopping the turbine fracturing device, the stop instruction triggers the idling instruction.

For example, the idling instruction triggers a brake instruction, and the brake operation is triggered in response to the brake instruction.

At least one embodiment of the present disclosure provides a turbine fracturing device, operated by any one of the operation methods as described above.

For example, the speed reducer includes a reduction gearbox, the speed reducer is connected with the fracturing pump through a transmission shaft.

For example, the brake mechanism includes a brake plate and a brake block, the brake block is arranged on the reduction gearbox, the brake plate is connected with the transmission shaft, and the brake block is driven by a hydraulic unit.

BRIEF DESCRIPTION OF THE DRAWINGS

In order to illustrate the technical solutions of the embodiments of the present disclosure, the drawings of the embodiments will be briefly described in the following; the described drawings below are only related to some example embodiments of the present disclosure and thus are not construed as any limitation to the present disclosure.

DETAILED DESCRIPTION

Figure 1:
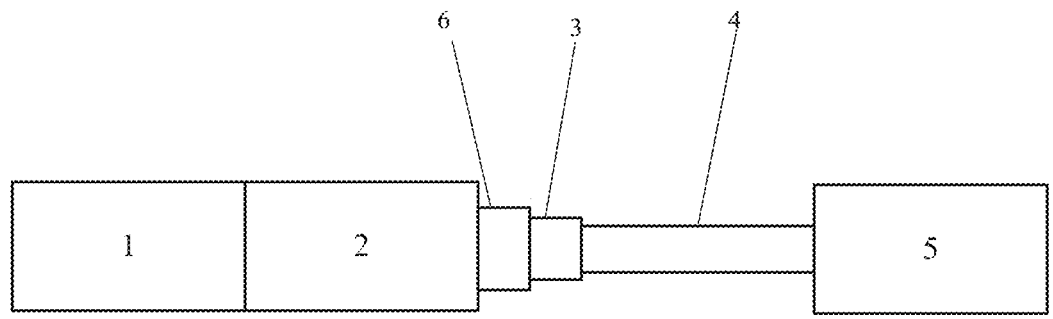
FIG. 1 is a schematic diagram of an example turbine fracturing device provided by an embodiment of the present disclosure.

In order to make objectives, technical details, and advantages of the embodiments of the present disclosure clearer, the technical solutions of the embodiments are described below in connection with the drawings related to the embodiments of the present disclosure. Apparently, the described embodiments are just examples but not all of the embodiments of the present disclosure. Based on the described embodiments herein, those having ordinary skill in the art can obtain/derive other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the described object is changed, the relative position relationship may be changed accordingly.

A fracturing operation has two basic requirements on fracturing equipment. Firstly, there can be no displacement output at an engine warm-up stage, and a fracturing pump can be started to provide displacement (of fracturing liquid) only when necessary. Secondly, in case of an emergency situation such as an overpressure situation, the output needs to be cut off urgently, that is, the fracturing pump needs to be separated from a front end to avoid accidents.

Some existing fracturing equipment is provided with a clutch. However, because the clutch cannot be engaged at a high speed. That is, the clutch can be engaged only before starting, and otherwise, the clutch may be damaged. Therefore, the clutch is engaged before starting, and a turbine engine is started when the displacement is needed; and in case of emergency, the clutch is separated, and the fracturing pump is stopped under an inertia effect or a load of a wellhead.

However, some problems occur in the case where a turbine fracturing device adopts the clutch to implement the quick separation. Firstly, the clutch must be engaged before the starting of the equipment, which restricts an application range of the clutch. The clutch can be engaged only before the starting. If the clutch is engaged again after the overpressure, it is necessary to stop the equipment, thus the quick starting of the equipment cannot be realized. Secondly, after the overpressure protection, the clutch separates the fracturing pump quickly from a speed reducer or a reduction gear assembly, and the instantaneous loss of load leads to possible runaway of the turbine engine, which brings risks to the turbine engine. Of course, in the implementation where the fracturing pump is stopped by the inertia effect or the load of the wellhead, certain impact on the output end may still be present during the stopping process. Moreover, the clutch is not suitable for being started and stopped frequently, because that may easily cause the damage to seals, shortens the service life, and increases the maintenance cost of various components.

FIG. 1 is a schematic diagram of a turbine fracturing device provided by an embodiment of the present disclosure. As illustrated in FIG. 1, the turbine fracturing device includes a turbine engine 1, a speed reducer 2 (alternatively referred to as a reduction gearbox, reduction gear set, reduction gear assembly, and the like), a torque limiter 3, a transmission mechanism 4, and a fracturing pump 5. As illustrated in FIG. 1, the turbine engine 1, the speed reducer 2, the torque limiter 3, the transmission mechanism 4, and the fracturing pump 5 are connected in sequence to form a transmission system of the turbine fracturing device. For example, the transmission mechanism 4 includes a coupling. For example, the fracturing pump 5 includes a piston pump. For example, the fracturing pump 5 is configured to suck/intake/draw low-pressure fracturing fluid and pressurize the low-pressure fracturing fluid to form high-pressure fracturing fluid. The pressure of the high-pressure fracturing fluid is greater than the pressure of the low-pressure fracturing fluid. The low-pressure fracturing fluid may also be referred to as suction fluid. The high-pressure fracturing fluid may also be referred to as discharge fluid. The low-pressure fracturing fluid may also be referred to as fluid of first pressure. The high-pressure fracturing fluid may also be referred to as fluid of second pressure. For example, the fracturing pump 5 is configured to suck the fluid of the first pressure and discharge the fluid of the second pressure. The second pressure is greater than the first pressure. For example, in some implementations, the turbine fracturing device provided by some embodiments of the present disclosure may also not be provided with the torque limiter 3. In this case, the speed reducer 2 is connected with the fracturing pump 5 through the transmission mechanism 4.

As illustrated in FIG. 1, a brake mechanism 6 may be arranged between the speed reducer 2 and the fracturing pump 5 to control the connection between the speed reducer 2 and the fracturing pump 5. According to the turbine fracturing device provided by the embodiments of the present disclosure, the brake mechanism 6 is provided to make the speed reducer 2 disconnected from the fracturing pump 5. The speed reducer 2 and the fracturing pump 5 may be in a disconnected or a connected state. In the embodiments of the present disclosure, when the speed reducer 2 and the fracturing pump 5 are in the disconnected state, the fracturing pump 5 is in a non-operating state, when the speed reducer 2 and the fracturing pump 5 are in the connected state, the fracturing pump 5 is in an operating state.

Figure 2:
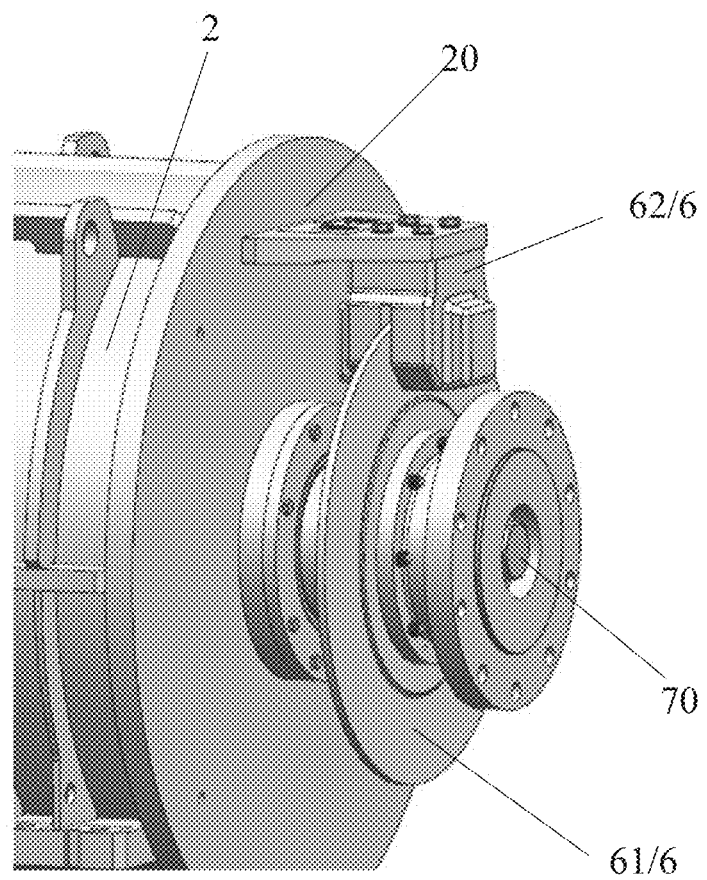
FIG. 2 is a perspective schematic view of an example brake mechanism of a turbine fracturing device provided by an embodiment of the present disclosure.
Figure 3:
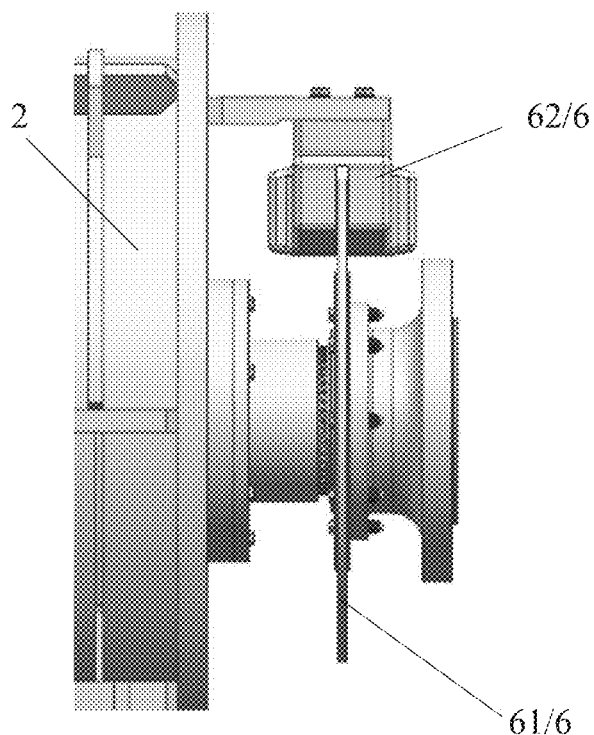
FIG. 3 is a side view of an example brake mechanism of a turbine fracturing device provided by an embodiment of the present disclosure.

FIG. 2 is a perspective schematic view of a brake mechanism of a turbine fracturing device provided by an embodiment of the present disclosure. FIG. 3 is a side view of a brake mechanism of a turbine fracturing device provided by an embodiment of the present disclosure. As illustrated in FIG. 2 and FIG. 3, the brake mechanism 6 includes a brake plate 61 and a brake block 62. For example, the friction between the brake plate 61 and the brake block 62 plays a brake role. For example, the brake block 62 may also be referred to as a friction block. For example, in a brake state, the brake mechanism 6 is used as a load of an output shaft of the turbine engine to bear the power output of the output shaft of the turbine engine, so as to place the fracturing pump 5 is in the non-operating state. FIG. 1 to FIG. 3 are illustrated with reference to the case where the brake mechanism 6 is located at a side of speed reducer 2 opposite to a side of the speed reducer 2 that is connected with the turbine engine 1. Such configuration is merely one example implementation. The embodiments of the present disclosure are not limited thereto. In other alternative embodiments, the brake mechanism 6 may also be arranged at other suitable positions/locations. For example, the brake mechanism 6 may be arranged between the transmission mechanism 4 and the fracturing pump 5, e.g., arranged on an input shaft of the fracturing pump 5.

The embodiments of the present disclosure take the turbine fracturing device illustrated in FIG. 1 to FIG. 3 as an example for description, but are not limited thereto. The structure of the turbine fracturing device may be determined according to the requirements.

Figure 4:
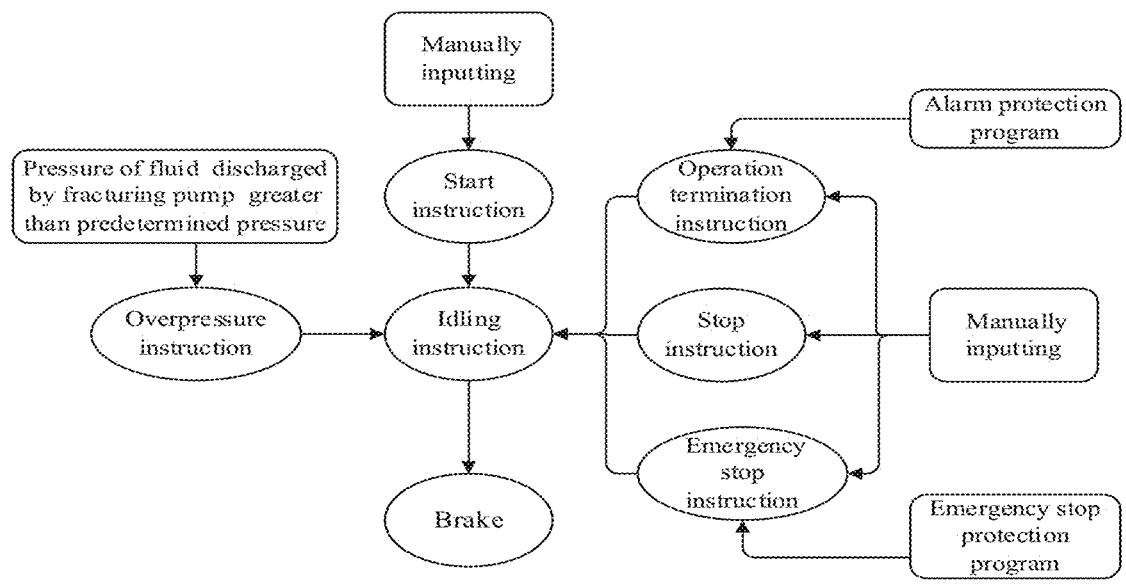
FIG. 4 is a schematic diagram of an example operation method of a turbine fracturing device provided by an embodiment of the present disclosure.

FIG. 4 is a schematic diagram of an operation method of the turbine fracturing device provided by an embodiment of the present disclosure. As illustrated in FIG. 4, the entire operation of the turbine fracturing device is carried out according to an idling instruction. The idling instruction controls the brake operation directly.

At least one embodiment of the present disclosure provides an operation method of a turbine fracturing device. Referring to FIG. 1 to FIG. 4, the turbine fracturing device includes a turbine engine 1, a speed reducer 2, a brake mechanism 6, and a fracturing pump 5. The operation method of the turbine fracturing device includes: driving, by the turbine engine 1, the fracturing pump 5 to perform a fracturing operation through the speed reducer 2 so as to keep the fracturing pump 5 in an operating state; and in response to an idling instruction, the turbine engine 1 entering an idling state, and triggering a brake operation to keep the fracturing pump 5 in a non-operating state. For example, when the turbine engine 1 is in the idling state, the output power of the turbine engine 1 is very small.

For example, in other embodiments, the operation method of the turbine fracturing device includes: in response to the idling instruction, the turbine engine 1 entering the idling state; and the idling instruction triggering a brake instruction, and in response to the brake instruction, triggering the brake operation to keep the fracturing pump 5 in the non-operating state. Responding to the brake instruction or performing the brake operation, the turbine fracturing device enters a brake state. For example, the brake operation is to control a rotation speed of an output shaft of a reduction gearbox. For example, the brake instruction is triggered at the same time when the turbine engine 1 is in the idling state. For example, the brake instruction is triggered at the same time when the idling instruction is issued.

The fracturing pump 5 is in the operating state when the fracturing pump 5 sucks low-pressure fluid and discharges high-pressure fluid. The fracturing pump 5 is in the non-operating state, when the fracturing pump 5 does not suck the low-pressure fluid and does not discharge the high-pressure fluid. For example, the fracturing pump 5 is in the operating state, which may refer to that the fracturing pump 5 has displacement output. The fracturing pump 5 is in the non-operating state, which refers to that the fracturing pump 5 has no displacement output.

For example, referring to FIG. 1, an output shaft of the turbine engine 1 is connected with an input shaft of the speed reducer 2. An output shaft of the speed reducer 2 is connected with the input shaft of the fracturing pump 5.

For example, the idling state refers to another state of the turbine engine 1. In response to the idling instruction, the turbine fracturing device adjusts the rotation speed of the output shaft of the turbine engine 1. For example, in the case where the turbine engine 1 is driven by fuel, the rotation speed of the output shaft of the turbine engine 1 may be adjusted by adjusting a fuel intake quantity/flow. For example, the rotation speed of the output shaft of the turbine engine 1 may be reduced by reducing the fuel intake quantity/flow. For example, in the case where the turbine engine 1 is driven by gas fuel, the rotation speed of the output shaft of the turbine engine 1 may be adjusted by adjusting the gas intake quantity/flow, pressure, and the like. For example, the rotation speed of the output shaft of the turbine engine 1 may be reduced by reducing the gas intake quantity/flow, pressure, and the like.

For example, in the idling state, the rotation speed of the output shaft of the turbine engine 1 is less than the rotation speed of the turbine engine 1 when driving the fracturing pump 5 to perform the fracturing operation. For example, in the idling state, the rotation speed of the output shaft of the turbine engine 1 is stable and greater than a set value, for example, the set value is 0, that is, in the idling state, the rotation speed of the output shaft of the turbine engine 1 is greater than 0. For example, in the idling state, the rotation speed of the output shaft of the turbine engine 1 is relatively small. For example, in a brake state, the rotation speed of the output shaft of the turbine engine 1 is 0. For example, in the case where the turbine fracturing device is in the operating state, the rotation speed of the output shaft of the turbine engine 1 is greater than the rotation speed of the input shaft of the fracturing pump 5.

For example, as illustrated in FIG. 4, the operation method of the turbine fracturing device further includes: triggering an overpressure instruction in the case where the pressure of the fluid of the second pressure discharged by the fracturing pump 5 is greater than an overpressure protection value, and the overpressure instruction triggering the idling instruction. In response to the overpressure instruction, the turbine fracturing device enters an overpressure protection state.

For example, the overpressure instruction is sourced/generated from a pressure sensor of the fracturing pump. The pressure sensor is configured to detect a pressure of the high-pressure fracturing fluid of the fracturing pump. When the pressure sensor detects that the pressure of the high-pressure fracturing fluid is greater than the predetermined overpressure protection value, the overpressure instruction is triggered directly, and the idling state is further triggered.

For example, as illustrated in FIG. 4, the operation method of the turbine fracturing device further includes: starting the turbine engine 1 in response to a start instruction before the fracturing pump 5 is in the operating state; and the start instruction triggering the idling instruction, so that the turbine engine 1 is in the idling state during a start process of the turbine engine 1.

For example, during the start process of the turbine engine 1, the start instruction is controlled manually. In response to the start instruction, the turbine fracturing device executes a start process; and during the entire start process, the turbine fracturing device is always in the idling state.

For example, as illustrated in FIG. 4, the operation method of the turbine fracturing device further includes: terminating the operating state of the fracturing pump 5 in response to an operation termination instruction when the fracturing pump 5 is in the operating state, and the operation termination instruction may trigger the idling instruction.

For example, as illustrated in FIG. 4, the operation termination instruction is inputted manually to terminate the operating state of the fracturing pump 5.

For example, as illustrated in FIG. 4, the operation termination instruction is triggered by an alarm protection program to terminate the operating state of the fracturing pump 5; and the alarm protection program includes triggering the operation termination instruction in at least one of the following conditions: when the pressure of the lubricating oil of the fracturing pump 5 is less than a first predetermined value, when the temperature of the lubricating oil of the fracturing pump 5 is greater than a second predetermined value, or when the pressure of the lubricating oil of the speed reducer 2 is less than a third predetermined value. For example, the alarm protection program may be a preset/preconfigured program.

For example, when the fracturing pump 5 is in the operating state, the operation termination instruction may be triggered under two conditions: one is that the operation termination instruction is inputted manually according to the operation displacement requirement to terminate the operating state of the fracturing pump 5, so that the turbine engine 1 enters the idling state. The other one is to trigger the operation termination instruction according to the preset alarm protection program. For example, the operation termination instruction may be triggered by one or more of the conditions such as the low pressure of the lubricating oil of the fracturing pump, the high temperature of the lubricating oil of the fracturing pump, and the low pressure of the lubricating oil of the reduction gearbox.

For example, as illustrated in FIG. 4, the operation method of the turbine fracturing device further includes: stopping the operation of the fracturing pump in response to an emergency stop instruction; The emergency stop instruction may trigger the idling instruction. the triggering the emergency stop instruction includes at least one of triggering the emergency stop instruction by an emergency stop protection program or manually judging emergencies to trigger the emergency stop instruction on the premise that the emergency stop protection program is not triggered. The emergency stop protection program includes triggering the emergency stop instruction in at least one of the following conditions: when the pressure of the lubricating oil of the turbine engine 1 is less than a fourth predetermined value, hen a vibration amplitude of the turbine engine 1 is greater than a fifth predetermined value, or when the exhaust temperature of the turbine engine 1 is greater than a sixth predetermined value. For example, the emergency stop protection program is a preset program.

For example, the emergency stop instructions are from two example manners. One is to manually judge the emergencies to trigger the emergency stop instruction on the premise that the emergency stop protection program is not triggered, and then to further trigger the idling state. The other one is to trigger the preset emergency stop protection program to keep the turbine fracturing device in an emergency stop state, e.g., the emergency stop instruction is triggered in at least one of the following conditions: when the pressure of the lubricating oil of the turbine engine is excessively low, when the vibration amplitude of the turbine engine is excessively high, or the exhaust temperature of the turbine engine is excessively high, and the idling state is further triggered.

For example, the operation method of the turbine fracturing device further includes: stopping the operation in response to the stop instruction so that the turbine fracturing device is stopped, the stop instruction triggering the idling instruction.

When the operation is ended and the stop is needed, the stop instruction is inputted manually, the stop instruction triggers the idling instruction, and the turbine engine 1 enters the idling state; and the idling instruction triggers the brake operation, so that the turbine fracturing device is stopped.

As illustrated in FIG. 4, at least one of the overpressure instruction, the start instruction, the operation termination instruction, the stop instruction and the emergency stop instruction may trigger the idling instruction, and further trigger the brake operation.

The brake operation is triggered by the above idling instruction or brake instruction so as to realize the brake operation of the turbine fracturing device. For example, in some embodiments, the idling instruction triggers the brake operation directly.

According to the operation method of the turbine fracturing device provided by the embodiments of the present disclosure, the idling instruction makes the turbine engine enter the idling state and triggers the brake operation, which is beneficial to the quick use and response of the turbine fracturing device and beneficial to the quick re-operation of the turbine fracturing device, thereby improving the operation reliability of the turbine engine and the reliability of a fracturing well site. The turbine fracturing device provided by the embodiments of the present disclosure has no clutch, and adopts the brake mechanism to perform the brake operation when the turbine engine is in the idling state.

Compared with the turbine fracturing device provided with a clutch, the turbine fracturing device provided with the brake mechanism has at least one of the following advantages.

(1) The clutch is complicated in structure, and it is troublesome to replace spare parts, especially vulnerable parts such as oil seals. The brake mechanism is simple in structure and convenient to install, and it is convenient to replace the brake plate of the brake mechanism.

(2) The clutch needs to be engaged and connected only at a low speed. If the clutch is disconnected, the clutch can be reconnected only after the speed of the turbine fracturing device is reduced; therefore, there are restrictions on the operation of the turbine fracturing device. While the engagement and disconnection of the brake mechanism have no requirement on the rotation speed.

(3) In the working state, the clutch must be in a connected state, and if the clutch is in failure, the field operation cannot be continued. However, in the working state, the brake operation is in the disconnected state, and if the brake mechanism is in failure, the normal operation of the turbine fracturing device is not affected.

(4) The brake operation is started in the start process. The start process may be judged automatically without determining the state of the turbine fracturing device, such as the engagement and separation judgment.

(5) The turbine fracturing device provided with the brake mechanism may determine whether to enter the idling state or the operating state as required. The turbine fracturing device may be started in advance, and may also be put into use at any time by switching the operating state and the idling state at any time. The turbine fracturing device provided with the clutch has an excessively long start process, which affects the quick use and response of the turbine fracturing device.

(6) It is only necessary to trigger the idling instruction and the brake operation after the overpressure, and it is unnecessary to trigger the stop instruction, so that the turbine fracturing device may be re-operated quickly.

(7) The brake operation needs to consume power, which may make the turbine fracturing device stopped under the load instead of transmitting the power to the power-user end, so that the operation risk of the turbine engine and the risk of the well site may be reduced, and the operation reliability of the turbine engine and the reliability of the fracturing well site can be improved.

For example, in some embodiments of the present disclosure, the first predetermined value, the second predetermined value, the third predetermined value, the fourth predetermined value, the fifth predetermined value, and the sixth predetermined value may be set according to requirements.

At least one embodiment of the present disclosure further provides a turbine fracturing device, which is operated by any one of the above operation methods.

For example, referring to FIG. 2 and FIG. 3, a speed reducer 2 includes a reduction gearbox 20. The speed reducer 2 is connected with a fracturing pump 5 through a transmission shaft 70. A brake mechanism includes a brake plate 61 and a brake block 62. The brake block 62 is arranged on the reduction gearbox 20. The brake plate 61 is connected with the transmission shaft 70. The transmission shaft 70 is an output shaft of the speed reducer 2. For example, the speed reducer 2 further includes a speed reduction mechanism located in the reduction gearbox 20. For example, the brake plate 61 rotates with the transmission shaft 70. For example, in response to the idling instruction or the brake instruction or when the turbine engine 1 is in an idling state, the brake block 62 contacts the brake plate 61 to perform the brake operation so as to control a rotation speed of the transmission shaft 70 of the reduction gearbox 2, so that the rotation speed of the transmission shaft 70 is reduced, for example, the brake operation may make the rotation speed of the transmission shaft 70 become 0.

Figure 5:
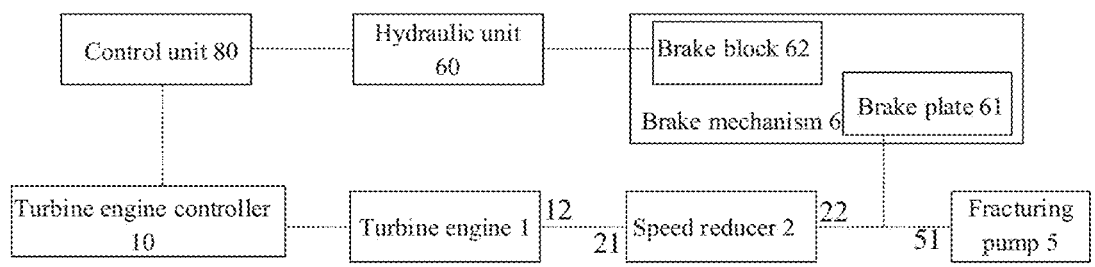
FIG. 5 is a schematic diagram of an example turbine fracturing device provided by an embodiment of the present disclosure.

FIG. 5 is a schematic diagram of the turbine fracturing device provided by an embodiment of the present disclosure. As illustrated in FIG. 5, the brake block 62 is driven by a hydraulic unit 60. For example, in response to the idling instruction or the brake instruction, the hydraulic unit 60 controls the brake block 62 to perform brake. For example, the hydraulic unit 60 controls the brake block 62 to move so as to contact and rub with the brake plate 61, thereby achieving a brake effect. For example, the hydraulic unit 60 includes a hydraulic pump, a hydraulic motor, and a control valve.

As illustrated in FIG. 5, the turbine fracturing device further includes a control unit 80. The control unit 80 controls the hydraulic unit 60 to drive the brake block 62.

As illustrated in FIG. 5, the turbine engine 1 includes an output shaft 12. The speed reducer 2 includes an input shaft 21 and an output shaft 22. The fracturing pump 5 includes an input shaft 51. As illustrated in FIG. 5, the output shaft 12 of the turbine engine 1 is connected with the input shaft 21 of the speed reducer 2. The output shaft 22 of the speed reducer 2 is connected with the input shaft 51 of the fracturing pump 5. For example, the output shaft 22 may be the above transmission shaft 70.

As illustrated in FIG. 5, the turbine fracturing device further includes a turbine engine controller 10. The control unit 80 is connected with the turbine engine controller 10 so as to control the rotation speed of the output shaft 12 of the turbine engine 1.

Figure 6:
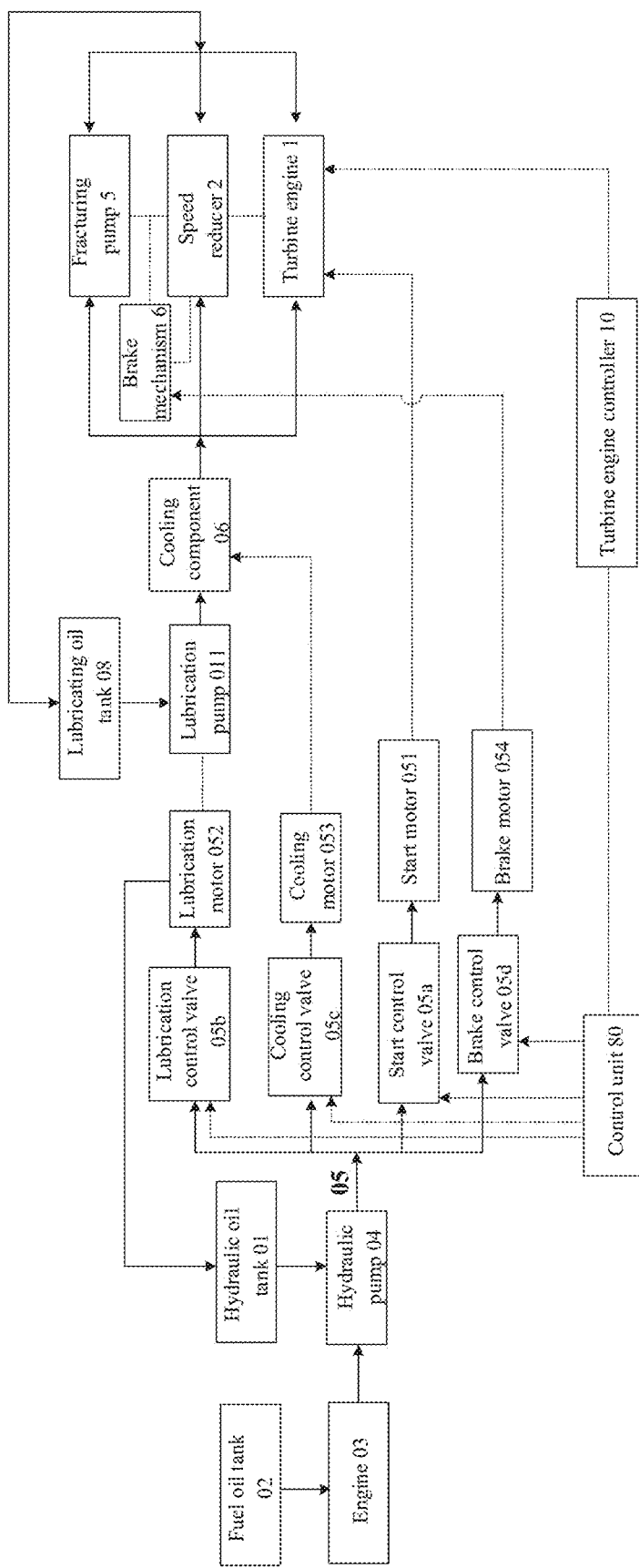
FIG. 6 is a schematic diagram of an example turbine fracturing device provided by an embodiment of the present disclosure.

FIG. 6 is a schematic diagram of the turbine fracturing device provided by an embodiment of the present disclosure. As illustrated in FIG. 6, a solid line indicates hydraulic fluid, an arrow indicates a flowing direction of the hydraulic fluid, and a dotted line indicates mechanical connection between components.

As illustrated in FIG. 6, a fuel oil tank 02 supplies oil to an engine 03. The engine 03 is connected with a hydraulic pump 04. A hydraulic oil tank 01 is connected with the hydraulic pump 04.

As illustrated in FIG. 6, the hydraulic pump 04 supplies oil to one or more execution motors (or auxiliary motors) 05 of the turbine fracturing device. The execution motors 05 include, for example, a start motor 051, a lubrication motor 052, a cooling motor 053, and a brake motor 054. The lubrication motor 052 is connected with a lubrication pump 011 so as to drive the lubrication pump 011 to transmit the lubricating oil from a lubricating oil tank 08 to the fracturing pump 5, the speed reducer 2, and the turbine engine 1 for lubrication.

As illustrated in FIG. 6, the cooling motor 053 drives a cooling component 06. The start motor 051 is connected with the turbine engine 2 to start the turbine engine 2. The brake motor 054 drives the brake mechanism 6.

The turbine fracturing device may adopts an auxiliary engine as a power source to drive components such as lubricating component and cooling component of the whole equipment, and start component and gas supply component of the turbine engine. In some implementations, the auxiliary engine directly drives these components without the motors (electric motors) above. In some other implementations, the auxiliary engine may drive an electricity generating components for supplying electricity to the execution or auxiliary motors above.

As illustrated in FIG. 6, the turbine fracturing device includes a start control valve 05a, a lubrication control valve 05b, a cooling control valve 05c, and a brake control valve 05d.

As illustrated in FIG. 6, the control unit 80 is connected with the start control valve 05a, the lubrication control valve 05, the cooling control valve 05c, and the brake control valve 05d, respectively, to control the opening, closing and open degree of the corresponding control valves.

As illustrated in FIG. 6, the control unit 80 is connected with the turbine engine controller 10 to control the rotation speed of the output shaft 12 of the turbine engine 1.

FIG. 6 illustrates an example that the engine 03 of the hydraulic pump 04 is driven by fuel oil, and the start motor 051, the lubrication motor 052, the cooling motor 053 and the brake motor 054 are all hydraulic motors, but the turbine fracturing device provided by the embodiments of the present disclosure is not limited to the illustration of FIG. 6. For example, in some embodiments, the hydraulic motor may also be replaced by an electric motor.

The turbine fracturing device provided by the embodiment of the present disclosure may further include one or more processors and one or more memories. The processor may process data signals and may include various computing architectures such as a complex instruction set computer (CISC) architecture, a reduced instruction set computer (RISC) architecture or an architecture for implementing a combination of multiple instruction sets. The memory may store instructions and/or data executed by the processor. The instructions and/or data may include codes which are configured to achieve some functions or all the functions of one or more devices in the embodiments of the present disclosure. For instance, the memory includes a dynamic random-access memory (DRAM), a static random-access memory (SRAM), a flash memory, an optical memory or other memories well known to those skilled in the art.

In some embodiments of the present disclosure, the control unit 80, and/or the turbine engine controller 10 include codes and programs stored in the memories; and the processors may execute the codes and the programs to achieve some functions or all the functions of the control unit 80, and/or the turbine engine controller 10.

In some embodiments of the present disclosure, the control unit 80, and/or the turbine engine controller 10 may be specialized hardware devices and configured to achieve some or all the functions of the control unit 80, and/or the turbine engine controller 10. For instance, the control unit 80, and/or the turbine engine controller 10 may be a circuit board or a combination of a plurality of circuit boards and configured to achieve the above functions. In embodiments of the present disclosure, the circuit board or a combination of the plurality of circuit boards may include: (1) one or more processors; (2) one or more non-transitory computer-readable memories connected with the processors; and (3) processor-executable firmware stored in the memories.

Since a turbine engine can directly use natural gas as fuel and has the advantages of small size, light weight, high power density, etc., driving by a turbine engine, compared to by a diesel engine, is conducive to reducing the size of the fracturing device and has the advantages of environmental protection, high driving efficiency, etc. Moreover, the power supply pressure in a fracturing operation site can be reduced when a turbine engine is used for driving compared to directly using an electric motor for driving. In addition, the turbine engine further has the advantages of small size, light weight, high power density and the like.

In another aspect, the turbine engine generates power through the rotation of an impeller driven by a fluid. Therefore, it is necessary to keep the impeller and blades of the turbine engine clean and prevent device breakdown due to disruption in the balance of the impeller or damage of the impeller caused by impurities.

At least one embodiment of the present disclosure provides a fracturing device which includes a power unit. The power unit includes a muffling compartment, a turbine engine, an air intake unit and a cleaner. The air intake unit is communicated with the turbine engine through an intake pipe and is configured to provide a combustion-supporting gas to the turbine engine. The cleaner is configured to clean the turbine engine. The air intake unit is located at the top of the muffling compartment, and the muffling compartment has an accommodation space. The turbine engine and the cleaner are located within the accommodation space. The cleaner is located at the side, away from the air intake unit, of the turbine engine.

The fracturing device according to at least one embodiment of the present disclosure can facilitate the air intake unit to take in air by disposing the air intake unit above (at the top of) the turbine engine, and meanwhile can realize a compact structure by disposing the cleaner below the turbine engine such that the fracturing device is arranged/configured in three layers (i.e. upper, middle and lower layers), thereby reducing the size of the fracturing device and facilitating transportation. In addition, the turbine engine is disposed in the muffling compartment, which further facilitates noise reduction.

For example, the term "below" as used in this embodiment of the present disclosure is not necessarily about being "directly below" and may also mean "obliquely below".

In at least one embodiment, the cleaner is directly driven by electric power, i.e., by an electric motor, so that the space occupied by the cleaner can be effectively reduced, and it becomes feasible to place the cleaner below the turbine engine. For example, the highest point of the cleaner is below the lowest point of the turbine engine. Such an arrangement may prevent the cleaner from shielding or blocking the turbine engine in the height direction, thereby facilitating the maintenance of the turbine engine.

In another examples, the cleaner may also be driven pneumatically or hydraulically. The driving mode of the cleaner is not limited by the embodiments of the present disclosure.

Figure 7:
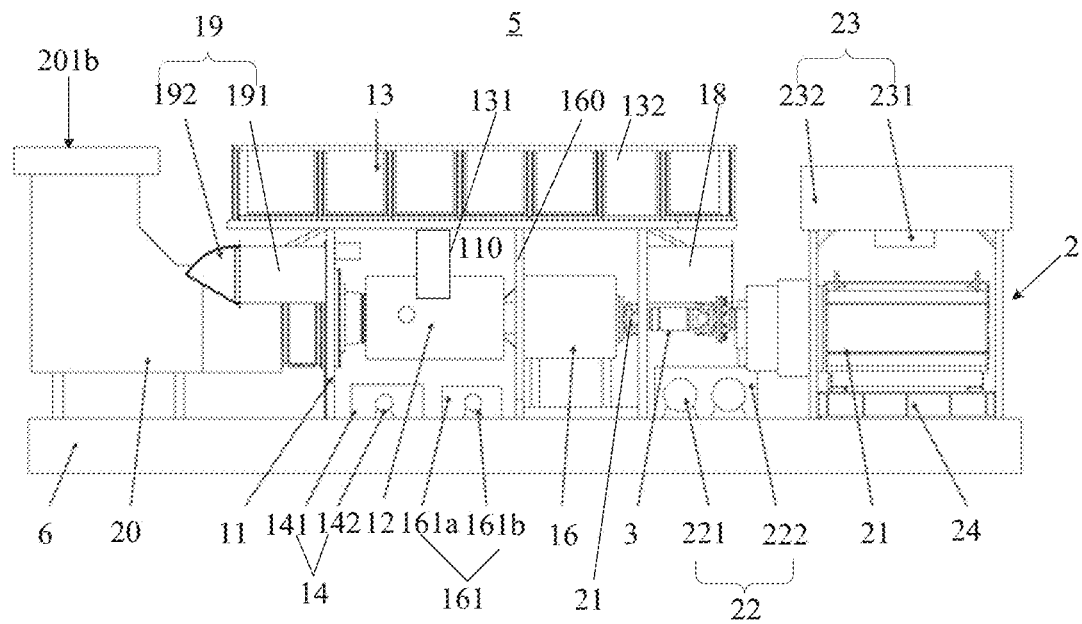
FIG. 7 is a structural schematic diagram of an example fracturing device according to at least one embodiment of the present disclosure.

FIG. 7 is a structural schematic diagram, for example, a side view, of a fracturing device according to at least one embodiment of the present disclosure.

As shown in FIG. 7, the fracturing device 5 includes a power unit. The power unit includes a muffling compartment 11, a turbine engine 12, an air intake unit 13 and a cleaner 14.

The muffling compartment 11 has an accommodation space 110, and the turbine engine 12 and the cleaner 14 are located within the accommodation space 110. For example, a muffler such as soundproof sponge or a muffler plate is disposed on the inner wall of the muffling compartment.

The air intake unit 13 is located at the top of the muffling compartment 11 and communicated with the turbine engine 12 through an intake pipe 131, and the air intake unit 13 is configured to provide a combustion-supporting air to the turbine engine 12. For example, the air intake unit 13 includes an intake filter and an intake muffler, and the intake muffler has one end connected to the intake filter and another end communicated with the intake pipe 131.

For example, the air intake unit 13 comprises a plurality of intake cabins 132 arranged side by side. The plurality of intake cabins 132 help enlarge the size of the air intake unit 13, thus providing a higher gas capacity to increase the power of the turbine engine 12. The intake cabins 132 also help reduce the resistance of air intake and exhaust, thereby facilitating prolonging the service life of the turbine engine.

For example, the air intake unit 13 extends beyond the length of the muffling compartment 11 in the axial direction of the turbine engine, helping enlarge the size of the intake cabins and protect (e.g., keep out the rain) the structure (e.g., an air inlet assembly and an air outlet assembly as described below) thereunder. It should be noted that the mentioned axial direction of the turbine engine may be the extension direction of a transmission shaft or an output shaft in the turbine engine.

The air intake unit 13 is fixed to the top of the muffling compartment 11, for example, by welding.

For example, the cleaner 14 is located away from the air intake unit 13, of the turbine engine 12, i.e., below the turbine engine. For example, the cleaner 14 may be located directly or obliquely below the turbine engine 12. For example, the cleaner 14 includes a water tank 141 and a cleaning pump 142. For example, the cleaner 14 is electrically driven, and the space used by the cleaner can thus be reduced. In another examples, the cleaner may be driven by an air compressor which is located, for example, outside the muffling compartment. The air compressor may be driven electrically, for example. In another further examples, the cleaner may be driven by a hydraulic system and the hydraulic system may be driven electrically, for example.

For example, the power unit 1 further includes a starter located within the muffling compartment 11 and configured to start the turbine engine 12.

Figure 8:
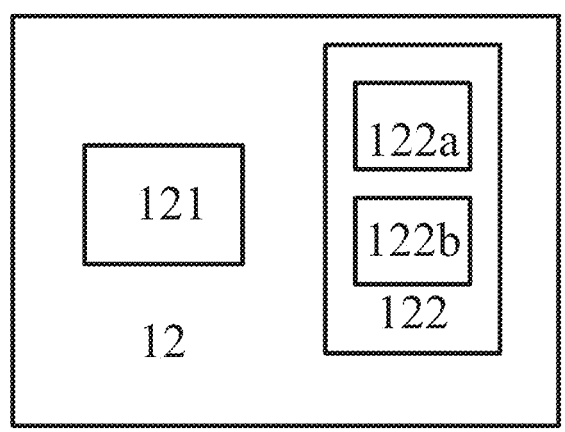
FIG. 8 is a structural schematic diagram of an example turbine engine according to at least one embodiment of the present disclosure.

For example, the starter includes an electric motor. For example, the electric motor is configured to directly start the turbine engine 12, i.e., the turbine engine is started electrically. In this case, for example, as shown in FIG. 8, the starter 121 may be integrated into the turbine engine.

The electric power needed to start the turbine engine is far less than that directly used to drive a fracturing pump unit, thus reducing the power supply demand in the fracturing work site.

In another examples, the turbine engine 12 includes a hydraulic system. The electric motor in the starter is configured to drive the hydraulic system to start the turbine engine, i.e., the hydraulic system is driven electrically. For example, the electric motor is located at the side, away from the air intake unit, of the turbine engine 12.

Compared with a diesel-driven hydraulic system, the electric motor takes up only small space and thus can be placed below the turbine engine.

For example, the hydraulic system includes a hydraulic pump, a hydraulic motor, various valves, a hydraulic oil reservoir, a hydraulic oil radiator, etc. For example, the hydraulic system is configured to be driven by the electric motor to drive a fuel pump, a starting motor and so on of the turbine engine 12, thereby starting the turbine engine 12.

For example, the power unit further includes a first lubricating system 122 configured to lubricate the turbine engine 12. FIG. 8 schematically shows a diagram of the turbine engine 12. As shown in FIG. 8, the first lubricating system 122 is integrated into the turbine engine 12.

The first lubricating system 122 includes a first lubricating oil reservoir 122a and a first driving mechanism 122b. The first driving mechanism includes an electric motor, that is, the first lubricating system is driven electrically.

For example, as shown in FIG. 7, the power unit 1 further includes a deceleration mechanism 16 and a second lubricating system 161 which are located within the muffling compartment 11. The second lubricating system 161 is configured to lubricate the deceleration mechanism 16. The deceleration mechanism 16 is connected to an output shaft of the turbine engine 12, and the deceleration mechanism 16 and the turbine engine 12 are arranged along the axial direction of the turbine engine 12.

The second lubricating system 161 includes a second lubricating oil reservoir 161a and a second driving mechanism 161b. The second driving mechanism 161b includes an electric motor, i.e., the second lubricating system 161 is driven electrically and thus can have a small size.

For example, as shown in FIG. 7, the second lubricating system 161 is located at the side, away from the air intake unit 13, of the turbine engine 12, for example, below the turbine engine 12. For example, the second lubricating system 16 and the cleaner 14 are arranged along the axial direction of the turbine engine 12, and the second lubricating system 16 is closer to the deceleration mechanism 16 than the cleaner 14, thus facilitating the lubrication of the deceleration mechanism 16 by the second lubricating system 161.

The muffling compartment is a relatively closed cabin. The operation of the turbine engine 12 can easily result in a high temperature or natural gas leakage within the muffling compartment and the danger is concealed, which may result in lagging danger judgment in human inspection without reliable guarantee for the safety of the personnel and the device.

For example, the power unit of FIG. 7 further includes a firefighting system. The firefighting system may realize advance warning on the danger within the muffling compartment. Moreover, in at least one example, the firefighting system may automatically extinguish fire within the muffling compartment 11, thus greatly improving the reliability of device operation and the safety of the personnel.

Figure 9A:
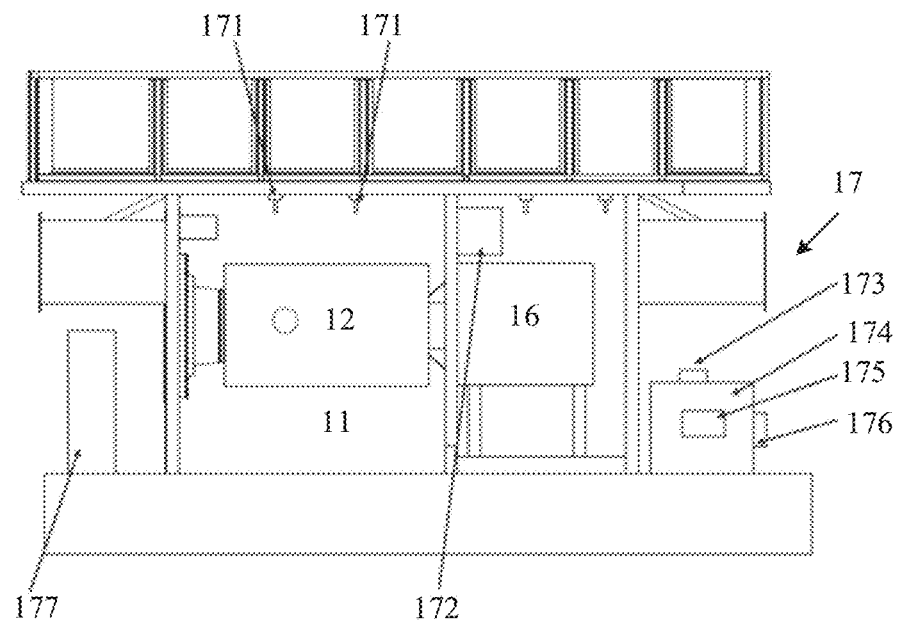
FIG. 9A is a structural schematic diagram of an example firefighting system according to at least one embodiment of the present disclosure.

FIG. 9A is a schematic diagram of a firefighting system according to at least some embodiments of the present disclosure. For the sake of clarity, some components of the fracturing device are omitted from FIG. 9A.

As shown in FIG. 9A, the firefighting system 17 includes at least one firefighting detector 171 and a firefighting material generator 172 which are located within the muffling compartment 11. The firefighting detectors 171 may include, but not be limited to, a temperature detector, a smoke detector, a flame detector, a combustible gas detector, etc. In the case where a plurality of types of firefighting detectors are used, the number of the firefighting detector of each type would not be limited.

The firefighting material generator 172 is filled with a firefighting material. For example, the firefighting material includes an aerosol. Compared with the traditional dry powder material, the aerosol in an equal volume can have a better fire extinguishing performance. As such, a container for the aerosol needs a smaller space and thus can be easily disposed within the muffling compartment 11.

As shown in FIG. 9A, the firefighting system 17 includes a plurality of firefighting detectors 171 disposed at the top of the muffling compartment 11 for detection at different positions within the muffling compartment 11. For example, the firefighting detectors 171 are disposed directly above the turbine engine 12 and/or the deceleration mechanism 16. The firefighting detectors 171 can be the same or different in type. The firefighting material generator 172 is disposed on a support column 160 between the turbine engine 171 and the deceleration mechanism 16.

For example, the firefighting system 17 further includes an alertor 173, a controller 174, a firefighting monitor 175 and an emergency switch 176 which are located outside the muffling compartment 11. The controller 174 is in signal/eletronic connection (e.g., communication connection) with the alertor 173, the turbine engine 171 and the firefighting material generator 172. In the case where an anomaly (e.g., that at least one of temperature, smoke consistency, combustible gas concentration in the muffling compartment 11 is above a threshold value, or a flame is generated) is detected by the firefighting detector 171, the controller 174 is triggered to control the firefighting material generator 172 to start automatically and to eject the firefighting material and simultaneously control the alertor 173 to give an alerting signal.

For example, the firefighting system 17 further includes a hand fire extinguisher 177 located outside the muffling compartment, allowing the personnel on the spot to extinguish fire manually. For example, the hand fire extinguisher 177 may be a dry powder fire extinguisher.

Figure 9B:
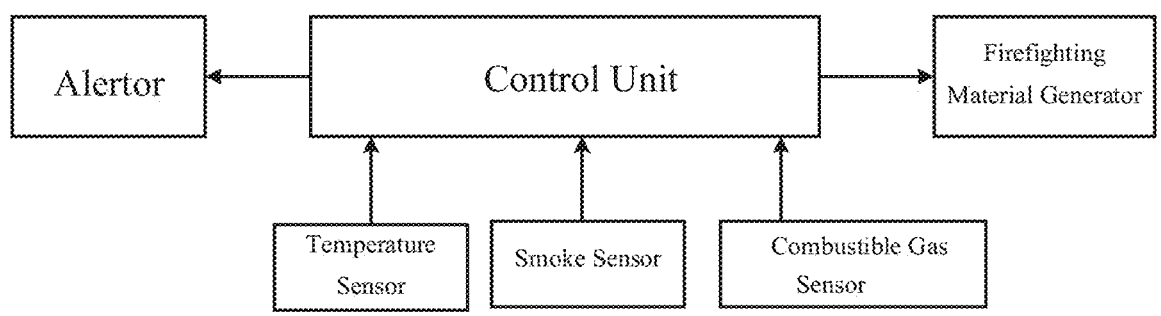
FIG. 9B is a structural schematic diagram of an example firefighting system according to some other embodiments of the present disclosure.

FIG. 9B is a schematic diagram of a firefighting system in a fracturing device according to another examples of the present disclosure. As shown in FIG. 9B, the firefighting system includes a control unit, an alertor, a firefighting material generator, a plurality of temperature sensors, a plurality of smoke sensors and a plurality of combustible gas sensors. The control unit is in signal connection with the alertor, the firefighting material generator, the temperature sensors, the smoke sensors and the combustible gas sensors respectively.

For example, the control unit is configured to control the plurality of temperature sensors to detect the temperature simultaneously at different positions within the compartment of the turbine engine and generate a temperature data set from the obtained temperature data. The operation is repeated cyclically and the temperature data sets are output, thus realizing the detection of the temperature in the compartment.

For example, the control unit is further configured to control the plurality of smoke detectors to detect smoke simultaneously at different positions within the compartment of the turbine engine and generate a smoke data set from the obtained smoke data. The operation is repeated cyclically and the smoke data sets are output, thus realizing the detection of the smoke in the compartment.

For example, the control unit is further configured to control the plurality of combustible gas sensors to detect the concentration of the combustible gas simultaneously at different positions within the compartment of the turbine engine and generate a combustible gas data set from the obtained combustible gas concentration data. The operation is repeated cyclically and the combustible gas data sets are output, thus realizing the detection of the combustible gas in the compartment. The combustible gas includes, for example, methane.

For example, the control unit is further configured to, in response to a preset temperature threshold value, cyclically determine whether more than half of temperature data in the temperature data sets is above the temperature threshold value, output fire information if yes, and output alert information if no, where the alert information contains the temperature data of the temperature above the temperature threshold value and detection positions thereof.

For example, the control unit is further configured to, in response to a smoke threshold value input from the outside, cyclically determine whether more than half of smoke data in the smoke data sets is above the smoke threshold value, output fire information if yes, and output alert information if no, where the alert information contains the smoke data of the smoke above the smoke threshold value and detection positions thereof.

For example, the control unit is further configured to, in response to a combustible gas concentration threshold value input from the outside, cyclically determine whether more than half of combustible gas concentration data in the combustible gas data sets is above the combustible gas concentration threshold value, output warning information if yes, and output alert information if no, where the alert information contains the values of combustible gas concentration above the combustible gas concentration threshold value and detection positions thereof.

For example, the control unit is further configured to, in response to the fire information, trigger the firefighting material generator to perform firefighting operation, for example, ejecting aerosol, carbon dioxide, etc., and simultaneously trigger the alertor to give an alerting signal, for example, a sound signal and/or a light signal. For example, the firefighting material generator includes a sprinkler having structures such as a nozzle, a liquid reservoir and a pipe.

For example, the control unit is further configured to recheck the detection of the combustible gas to improve the detection accuracy. For example, the control unit is configured to, in response to the fire information, determine whether the warning information is received simultaneously, carry out no operation if yes, and if no, generate an anomaly set from all combustible gas concentration data of combustible gas concentration below a combustible gas concentration threshold value and the detection positions thereof, and output the anomaly set.

The firefighting system can recheck and calibrate the combustible gas concentration sensors based on the temperature sensors and the smoke sensors, and avoid disfunction of the equipment and further improve the fire safety performance of the equipment.

For example, as shown in FIG. 7, the power unit further includes an air inlet assembly 18 and an air outlet assembly 19. The air inlet assembly 18 is located at one side of the turbine engine along the axial direction of the turbine engine and is communicated with the accommodation space of the muffling compartment 12. The air outlet assembly 19 is located at the other side of the turbine engine along the axial direction and disposed opposite to the air inlet assembly 8, and the air outlet assembly 19 is communicated with the accommodation space of the muffling compartment 12. The air inlet assembly 18 and the air outlet assembly 19 are configured to create a circulation environment in the muffling compartment, helping to dissipate heat from the compartment.

Figure 10A:
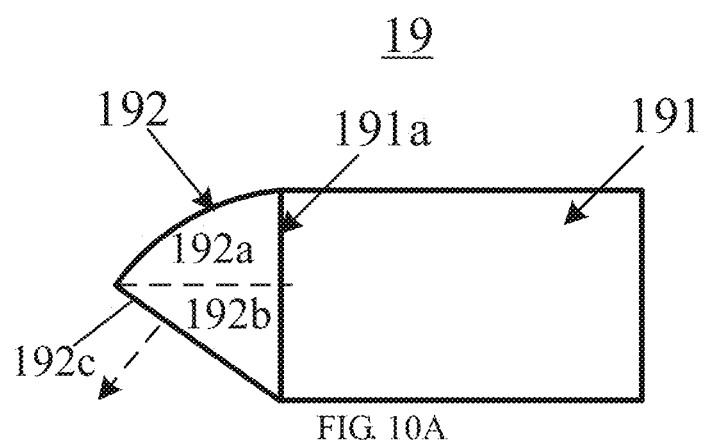
FIG. 10A is a structural schematic diagram of an example air outlet assembly according to at least one embodiment of the present disclosure.

FIG. 10A shows an enlarged schematic diagram of the air outlet assembly 19. For example, as shown in FIG. 10A, the air outlet assembly 19 includes an air outlet pipe 191 and a lead-out portion 192 connected to the air outlet pipe 191. The lead-out portion is configured to change an orientation of an air outlet 192c of the air outlet assembly, thereby effectively reducing sand wind that may enter the muffling compartment via the air outlet assembly to cause damage to the materials in the compartment.

For example, during loading or transportation of the fracturing device, the air outlet assembly 19 is generally closer to the front, namely the truck head, in the direction of transportation, while the air inlet assembly 18 is closer to the back, namely the truck tail. Thus, the fracturing device can be conveniently unloaded to carry out fracturing work after arriving at the work site. Consequently, during transportation, sand wind (wind containing sand) can easily get into the muffling compartment via the air outlet assembly 19.

As shown in FIG. 10A, the lead-out portion 192 is provided to change the orientation of the air outlet 192c of the air outlet assembly 19 from being horizontally forward (i.e., along the moving direction) to being obliquely downward, thus effectively reducing sand wind entering. The orientation of the air outlet 192c of the air outlet assembly 19 is shown by the dotted arrow in FIG. 10A. However, the orientation of the air outlet of the air outlet assembly with the lead-out portion is not limited in the embodiments of the present disclosure. In another examples, the air outlet 192c may be upward or oriented laterally, which is not limited in the embodiments of the present disclosure. For example, the lead-out portion 192 is rotatably connected to the air outlet pipe 191, and the orientation of the air outlet of the air outlet assembly 19 can be changed by rotating the lead-out portion 192.

As shown in FIG. 10A, for example, the lead-out portion 192 is in the shape of an elbow and has a cone-shaped section with a cone angle of, for example, 40°-60° (e.g., 45°).

For example, as shown in FIG. 10A, the lead-out portion 192 includes a shielding portion 192a and an air outlet portion 192b. The shielding portion 192a is configured to shield an air outlet 191a of the air outlet pipe 191 to keep out the external sand wind. The air outlet portion 192b is configured to exhaust the gas that flows from the air outlet pipe 191 into the lead-out portion 192. The dividing line between the shielding portion 192a and the air outlet portion 192b is shown by the dotted line perpendicular to the air outlet 191a of the air outlet pipe 191 in FIG. 10A, which actually is not necessarily present.

For example, the orthographic projection of the shielding portion 192a on the plane where the air outlet 191a of the air outlet pipe 191 is positioned at least partially overlapping with the air outlet 191a for shielding, with an overlapping area greater than 30% of the area of the air outlet to realize effective shielding.

The lead-out portion 192 is structurally designed to realize shielding, which does not need extra power or control.

Figure 10B:
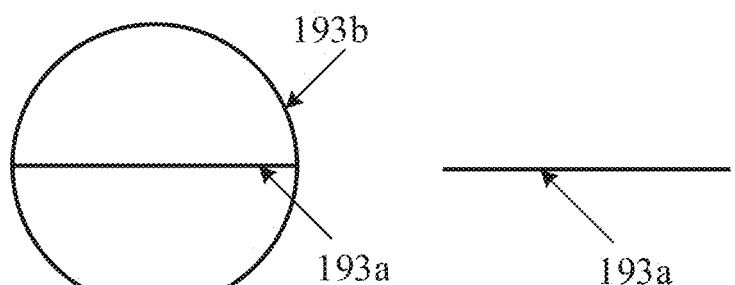
FIG. 10B is a structural schematic diagram of an example air outlet portion according to at least one embodiment of the present disclosure.

In another examples, for example, as shown in FIG. 10B, the air outlet portion 192b may include a revolving shaft 193a and a blade 193b disposed on the revolving shaft 193a. The blade 193b is capable of rotating around the revolving shaft, for example, under the action of an external force. For example, the revolving shaft and the blade are located at the air outlet of the air outlet portion. By rotating the blade, the air outlet portion can be opened and closed. For example, the air outlet portion may be closed during transportation and may be opened during fracturing. FIG. 10B shows a schematic diagram of the revolving shaft and the blade when the air outlet portion is closed (on the left of FIG. 10B) and opened (on the right of FIG. 10B) respectively in a direction perpendicular to the air outlet surface of the air outlet portion 192b.

Figure 11A:
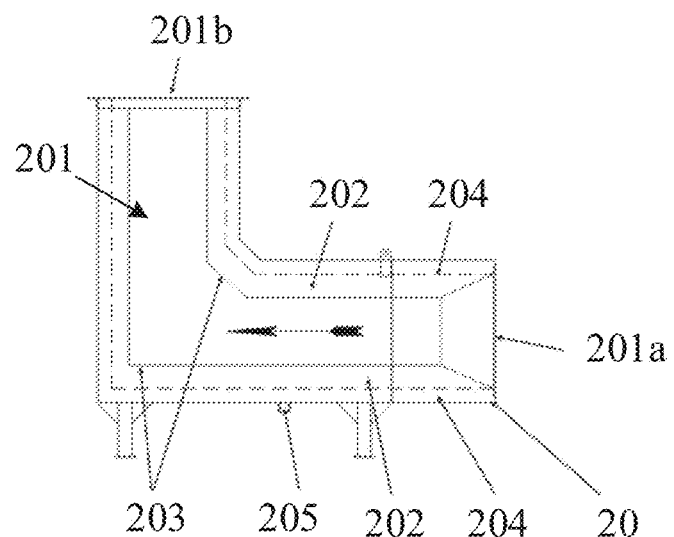
FIG. 11A is a structural schematic diagram of an example exhaust muffler according to at least one embodiment of the present disclosure.

For example, the power unit further includes an exhaust muffler which is communicated with the turbine engine 12 through an exhaust pipe and configured to allow the gas from the turbine engine 12 to be exhausted into the atmosphere after being muffled and deflected. FIG. 11A shows a structural schematic diagram of an exhaust muffler according to at least one embodiment of the present disclosure.

As shown in FIG. 11A, the exhaust muffler 20 includes an L-shaped exhaust delivery pipe 201. The L-shaped exhaust delivery pipe 201 has an intake port 201a at one end, and the intake port 201a is communicated with the turbine engine 12 through an exhaust pipe for exhaust intake, and the exhaust delivery pipe 201 has an upward exhaust port 201b at the other end, so as to discharge the exhaust from the turbine engine to the atmosphere. The direction of gas delivery is shown by the arrow in FIG. 11A.

The exhaust muffler 20 further includes a muffling layer 202 disposed on the inner wall of the gas delivery pipe 201 to serve for muffling. Noise generated during gas delivery can be effectively reduced when the gas in the gas delivery pipe 201 is in contact with the muffling layer 202. For example, the muffling layer 202 includes soundproof sponge.

For example, the exhaust muffler 20 further includes a perforated muffler plate 203 located on the inner wall of the muffling layer 202. The perforated muffler plate 203 has holes to allow the gas in the delivery pipe 201 to be in contact with the muffling layer 202 for muffling.

Figure 11B:
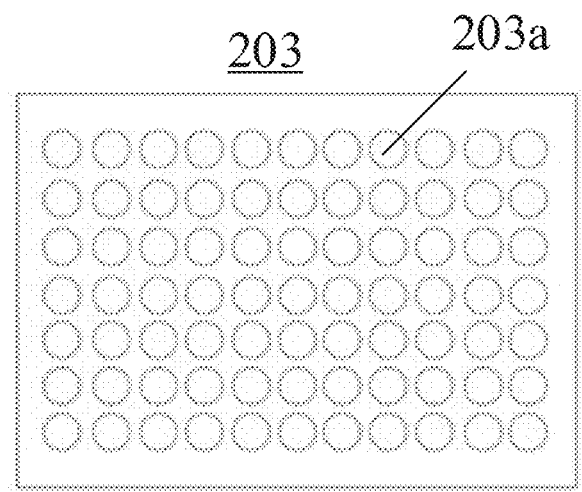
FIG. 11B is a structural schematic diagram of an example exhaust muffler plate according to at least one embodiment of the present disclosure.

FIG. 11B shows a structural schematic diagram of the perforated muffler plate 203. For example, the perforated muffler plate 203 is tubular, and FIG. 11B shows a partial schematic diagram of the perforated muffler plate 203.

For example, the perforated muffler plate 203 has a plurality of muffling holes 203a arranged in an array. Thus, the exhaust can be brought into full contact with the perforated muffler plate, and the muffling effect can be enhanced by collision between the exhaust and the hole walls of the perforated muffler plate 203. For example, the muffling hole 203a has a radius of 2-8 mm. The planar shape of the muffling hole is not limited in the embodiments of the present disclosure. For example, the planar shape of the muffling hole may be elongated round, oval, square, diamond, etc.

For example, as shown in FIG. 11A, the intake port 201a of the exhaust muffler 20 has a retracted structure. The inner diameter of the retracted structure is gradually reduced along the intake direction. The space undergoes contraction when the exhaust gas enters the gas delivery pipe 201, so that the gas flow direction changes rapidly, thereby improving the muffling effect.

For example, as shown in FIG. 11A, the exhaust muffler 20 further includes a thermal insulating layer 204 located between the inner wall of the exhaust muffler 20 and the muffling layer 202 to prevent a housing of the exhaust muffler from being too hot. For example, the thermal insulation design is necessary because the temperature of the exhaust gas from the turbine engine is up to 600° C.

For example, the exhaust muffler 20 further includes a water port 205 located in the bottom. For example, when water flows into the exhaust muffler 20, the water can be drained through the perforated muffler plate 203 and finally discharged via the water port 205.

The exhaust muffler 20 shown in FIG. 11A keeps the gas delivery pipe unblocked while serving for muffling, thus reducing the exhaust resistance and improving the exhaust efficiency.

Figure 11C:
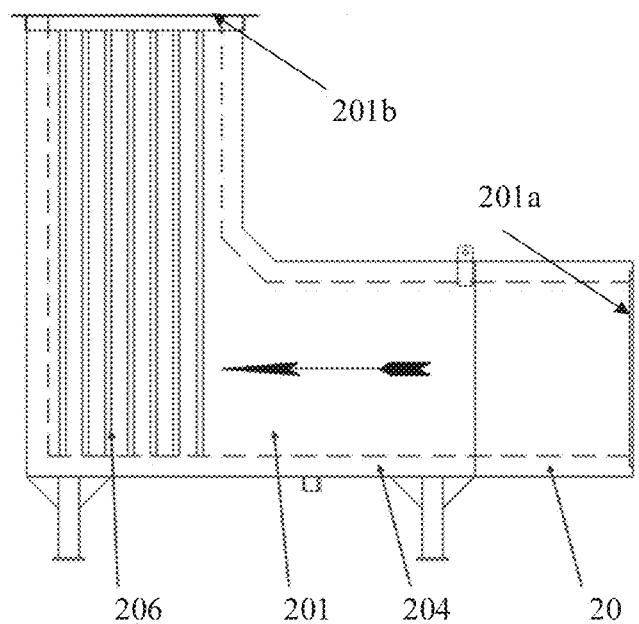
FIG. 11C is a structural schematic diagram of an example exhaust muffler according to some other embodiments of the present disclosure.

FIG. 11C is a structural schematic diagram of an exhaust muffler according to another embodiment of the present disclosure. As shown in FIG. 11C, the exhaust muffler 20 differs from the embodiment shown in FIG. 11A in that the exhaust muffler 20 includes a muffling barrier 206 to realize the noise reduction function by increasing the exhaust resistance. For example, the muffling barrier 206 includes a heat-resisting material to absorb noise. For example, the heat-resisting material is soundproof sponge. For example, the muffling barrier 206 is disposed in a branch, close to the exhaust port 201b, of the gas delivery pipe 201, and the exhaust gas entering the pipe arrives at the exhaust port 201b through the muffling barrier 206.

For example, in some examples, the air outlet of the lead-out portion 192 of the air outlet assembly 19 is oriented towards the outer surface of the exhaust muffler 20, so that the surface of the exhaust muffler is cooled by the exhaust gas from the air outlet assembly 19, thus realizing effective utilization of the exhaust gas.

As shown in FIG. 7, the fracturing device 5 further includes a fracturing pump unit 2. The fracturing pump unit 2 includes a fracturing pump 21 which is, for example, a plunger pump. The fracturing device 5 further includes a transmission mechanism 3. For example, the transmission mechanism 3 includes a coupling. For example, the coupling may be in the form of a flexible coupling, a transmission shaft, a clutch, etc.

The fracturing pump unit 2 is connected to the power unit 1 through the transmission mechanism 3, and the power unit 1 is configured to drive the fracturing pump 21 to carry out fracturing work. The turbine engine 12, the transmission mechanism 3 and the fracturing pump 21 are disposed in the axial direction of the turbine engine in sequence, for example, coaxially, thus improving the transmission efficiency.

Figure 12:
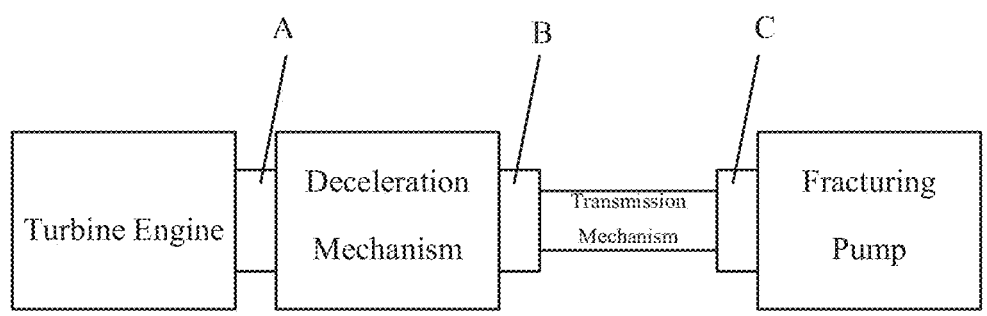
FIG. 12 is a schematic diagram of an example fracturing device according to some other embodiments of the present disclosure.

FIG. 12 is a schematic diagram of a fracturing device according to at least one embodiment of the present disclosure. As shown in FIG. 12, the turbine engine, the deceleration mechanism, the transmission mechanism and the fracturing pump are disposed in the axial direction of the turbine engine in sequence, for example, coaxially, thus improving the transmission efficiency.

For example, the fracturing device may further include a brake mechanism disposed between the turbine engine and the fracturing pump, thus realizing power cutoff between the fracturing pump and the turbine engine. For example, when the turbine engine is started, the speed is initially not high enough, and the brake mechanism may be started to prevent the pump from being driven and affecting the fracturing effect. For example, the brake mechanism may include a brake block, a brake caliper, etc.

As shown in FIG. 12, the brake mechanism may be disposed at any one or more of the position between the turbine engine and the deceleration mechanism (i.e. position A), the position between the deceleration mechanism and the transmission mechanism (i.e. position B) and the position between the transmission mechanism and the fracturing pump (i.e. position C), finally realizing mechanical power cutoff between power input and output. For example, as shown in FIG. 7, the brake mechanism may be located between the deceleration mechanism 16 and the transmission mechanism 3 or integrated into the deceleration mechanism 16, providing a more compact integrated structure.

As shown in FIG. 7, the fracturing pump unit 2 further includes a third lubricating system 22 which is configured to lubricate the fracturing pump 21. The third lubricating system 22 includes an electric motor 221 and is located at the side, away from the air intake unit 13, of the transmission mechanism 3. The third lubricating system 22 further includes a lubricating oil reservoir 222.

For example, as shown in FIG. 7, the third lubricating system 22 is located below the transmission mechanism 3, thus saving space.

For example, as shown in FIG. 7, the fracturing pump unit 2 further includes a lubricating oil heat sink 23 which is configured to cool the third lubricating system 22. The lubricating oil heat sink 23 is located above the fracturing pump 21, i.e., at the side, away from a base of the fracturing pump 21, of the fracturing pump 21. For example, the lubricating oil heat sink 23 includes an electric motor 231 and a radiator 232.

The lubricating oil heat sink 23 and the fracturing pump 21 are arranged longitudinally, providing a more compact structure.

For example, the fracturing pump unit 2 further includes a fracturing pump base 24 located below the fracturing pump 21 (i.e., at the side away from the air intake unit 13). The fracturing pump base 24 is configured to bolster the fracturing pump 21, so that the fracturing pump 21 and the turbine engine 12 are linearly arranged in the axial direction of the turbine engine 12, thus improving the transmission efficiency.

For example, as shown in FIG. 7, the fracturing device 5 further includes a bottom skid 6. The power unit and the pump unit 2 are mounted on the bottom skid 6 to be fixed.

In the example as shown in FIG. 7, the fracturing device 5 is a skid-mounted device. However, this is not limited in the embodiments of the present disclosure. In another examples, the fracturing device 5 may also be a vehicle-mounted device or a semitrailer mounted device.

Figure 13A:
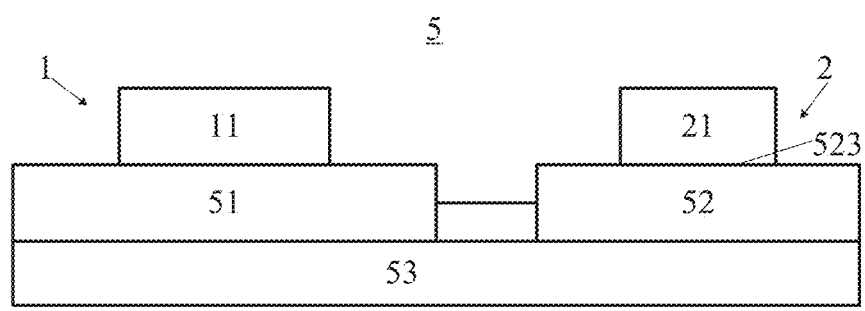
FIG. 13A is a structural schematic diagram of an example fracturing device according to still other embodiments of the present disclosure.

FIG. 13A is a schematic diagram of a fracturing device according to another embodiments of the present disclosure. As shown in FIG. 13A, the power unit 1 further includes a power skid 51. The muffling compartment 11 is mounted on the power skid 51 to be fixed. The pump unit 2 further includes a pump skid 52. The pump skid 52 has a bearing surface 523, and the fracturing pump 21 is mounted on the bearing surface 523 of the pump skid 52 to be fixed. Control circuits and circuit traces for the power unit 1 are disposed on the power skid 51 and control circuits and circuit traces for the pump unit 2 are disposed on the pump skid 52.

The forms of the power skid and the pump skid are not limited in the embodiments of the present disclosure. For example, the power skid/pump skid may merely include a bottom structure, or may include a bottom structure and a cage structure extending upwards. The cage structure is configured to further fix the unit mounted on the bottom structure.

For example, the power skid 51 and the pump skid 52 are detachably connected to facilitate transportation. The connection manner of the power skid 51 and the pump skid 52 is not limited in the embodiments of the present disclosure. For example, the two skids may be connected through a fastener, a connecting plate, etc.

For example, the power skid 51 and the pump skid 52 may be connected through a lug plate. One of the power skid 51 and the pump skid 52 has a single-lug plate, while the other one has a double-lug plate, and the two plates are connected through a pin shaft.

Figure 13B:
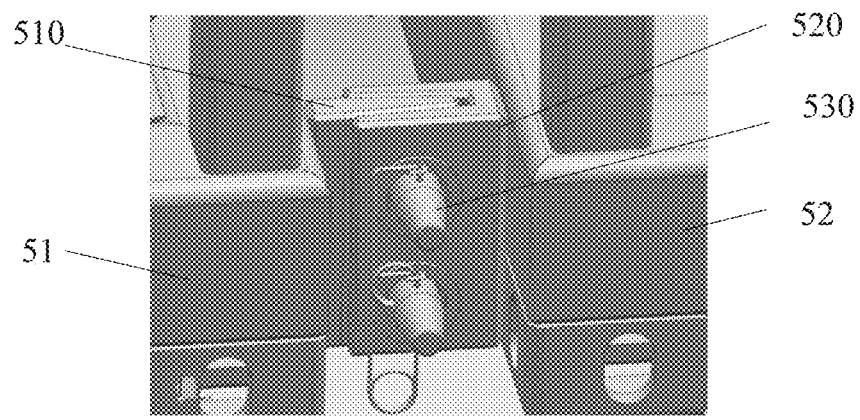
FIG. 13B and FIG. 13C are structural schematic diagrams of an example fracturing device according to further still other embodiments of the present disclosure.
Figure 13C:
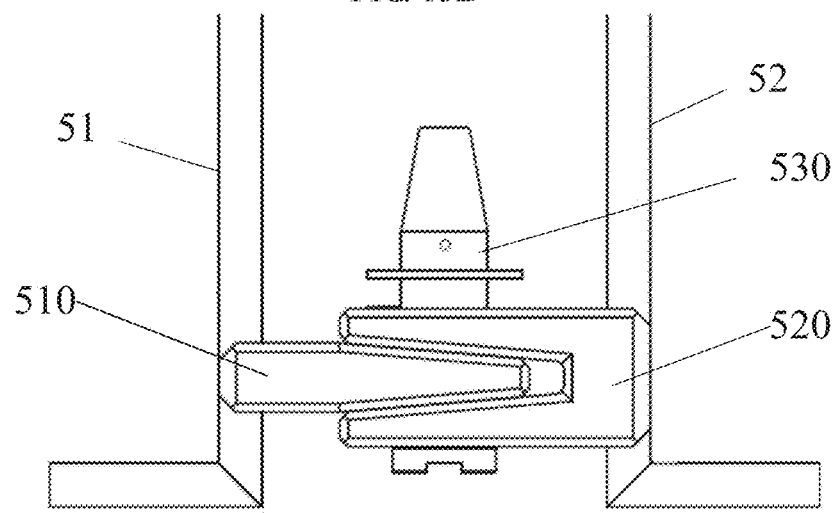

FIG. 13B shows a three-dimensional diagram of the connection between the power skid and the pump skid, and FIG. 13C shows a top view of the connection. As shown in FIG. 13B, the power skid 51 has a single-lug plate 510, while the pump skid 52 has a double-lug plate 520. The single-lug plate 510 is inserted into the double-lug plate 520. Pin holes of the two plates are aligned, and a pin shaft 530 is inserted into the pin holes to connect the power skid and the pump skid.

For example, the fracturing device 5 may further include an integrated skid 53. The power skid 51 and the pump skid 52 are respectively mounted on the integrated skid 53 to be fixed. For example, the power skid 51 and the pump skid 52 are detachably connected to the integrated skid 53 separately, thereby facilitating transportation.

Figure 14A:
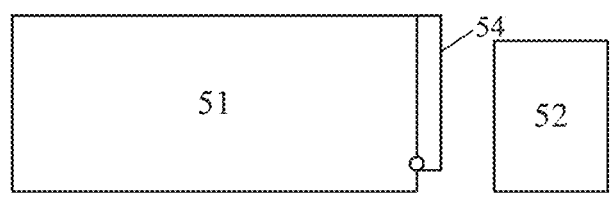
FIG. 14A and FIG. 14B are structural schematic diagrams of an example fracturing device according to still other embodiments of the present disclosure.
Figure 14B:
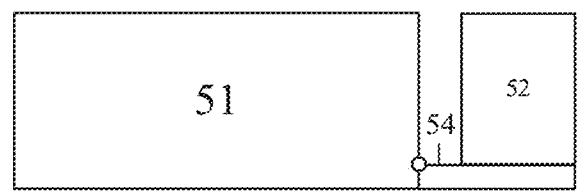

FIG. 14A and FIG. 14B are schematic diagrams of a fracturing device according to still another embodiment of the present disclosure. Unlike the embodiment shown in FIG. 13A, the power skid 51 includes a turnable mechanism 54 which is configured to be turned over to a horizontal state to carry the pump skid 52. For example, the pump skid 52 is detachably connected to the turnable mechanism 54. When the fracturing device is transported, the pump skid 52 may be removed and the turnable mechanism 54 may be recovered. After the arrival at the work site, the turnable mechanism 54 may be turned over to be horizontal and the pump skid 52 is mounted on the turnable mechanism 54. FIG. 14A and FIG. 14B show schematic diagrams of the turnable mechanism of the fracturing device being recovered and being working, respectively. For example, the power skid 51 may be integrated with the muffling compartment and the turbine engine and the pump skid may be integrated with the fracturing pump. For example, the turnable mechanism 54 may further serve to bolster the pump skid 52, so that the fracturing pump and the turbine engine are linearly arranged in the axial direction of the turbine engine, thus improving the transmission efficiency.

In at least one example, the turbine engine in the fracturing device is driven by a fuel (e.g., natural gas), while other auxiliary power systems (e.g., power for the lubricating systems, the cooling system, the cleaner, the starter, the brake mechanism, the deceleration mechanism, the heat sink and the gas pipe system) are all driven electrically. As a result, the fracturing device has the advantages of compact structure, small size and environmental protection while having high driving efficiency. In addition, the power supply pressure in the fracturing work site can be reduced.

In the case of no conflict, the features in the same embodiment or in different embodiments of the present disclosure can be combined with each other.

The above are only specific implementations of the present disclosure, and the protection scope of the present disclosure is not limited thereto. Any variations or substitutions conceivable for one skilled in the art who is familiar with the present technical field should be fallen within the protection scope of the present disclosure. Therefore, the protection scope of the present disclosure should be based on the protection scope of the claims

What is claimed is:

1. An operation method of a turbine fracturing device, the turbine fracturing device comprising a turbine engine, a speed reducer, a brake mechanism, and a fracturing pump mechanically coupled therebetween, the method comprising:

initiating a starting procedure of the turbine engine while maintaining the fracturing pump in a non-operating state by automatically engaging a brake operation in the brake mechanism;

automatically disengaging the brake operation in the brake mechanism after the turbine engine is started to transition the fracturing pump into an operating state;

driving, by the turbine engine, the fracturing pump in the operating state to perform a fracturing operation through the speed reducer to draw a fracturing fluid at a first pressure and discharge the fracturing fluid at a second pressure, the second pressure being greater than the first pressure; and in response to an idling instruction, transitioning the turbine engine into an idling state by triggering the brake operation so as to transition the fracturing pump into the non-operating state.

2. The operation method of the turbine fracturing device according to claim 1, wherein the idling instruction is automatically triggered upon an overpressure condition where the second pressure is detected as being greater than an overpressure protection threshold value.

3. The operation method of the turbine fracturing device according to claim 1, wherein the starting procedure of the turbine engine is triggered in response to a start instruction.

4. The operation method of the turbine fracturing device according to claim 1, wherein the idling instruction is triggered by an operation termination instruction when the fracturing pump is in the operating state.

5. The operation method of the turbine fracturing device according to claim 4, wherein the operation termination instruction is inputted manually to terminate the operating state of the fracturing pump.

6. The operation method of the turbine fracturing device according to claim 4, wherein the operation termination instruction is automatically triggered by a protection circuitry when detecting at least one of an under-pressure of a lubricating oil of the fracturing pump or the speed reducer, or an over-temperature of the lubricating oil of the fracturing pump.

7. The operation method of the turbine fracturing device according to claim 4, wherein the operation termination instruction is manually triggered via an emergency operation user interface.

8. The operation method of the turbine fracturing device according to claim 1, wherein idling instruction is automatically triggered by an emergency protection circuitry upon detecting at least one of an emergency under-pressure of a lubricating oil of the turbine engine, a vibration amplitude of the turbine engine being greater than a vibration threshold level, or an emergency exhaust over-temperature of the turbine engine.

9. The operation method of the turbine fracturing device according to claim 1, wherein the speed reducer comprises a reduction gearbox connected with the fracturing pump through a transmission shaft.

10. The operation method of the turbine fracturing device according to claim 9, wherein:

the brake mechanism comprises a brake plate and a brake block;

the brake block is arranged on the reduction gearbox;

the brake plate is connected with the transmission shaft; and the brake block is driven by a hydraulic unit.

11. A turbine fracturing device, comprising a turbine engine, a speed reducer, a fracturing pump mechanically coupled in sequence, a brake mechanism, and a control circuitry, the control circuitry being configured to:
- initiate a starting procedure of the turbine engine while maintaining the fracturing pump in a non-operating state by automatically engaging a brake operation in the brake mechanism;
- automatically disengage the brake operation in the brake mechanism after the turbine engine is started to transition the fracturing pump into an operating state;
- control the the turbine engine to drive the fracturing pump in the operating state to perform a fracturing operation through the speed reducer to draw a fracturing fluid at a first pressure and discharge the fracturing fluid at a second pressure, the second pressure being greater than the first pressure; and
- in response to an idling instruction, transition the turbine engine into an idling state by triggering the brake operation so as to transition the fracturing pump into the non-operating state.

12. The turbine fracturing device according to claim 11, wherein the idling instruction is automatically triggered by the control circuitry upon an overpressure condition where the second pressure is detected as being greater than an overpressure protection threshold value.

13. The turbine fracturing device according to claim 11, wherein the starting procedure of the turbine engine is triggered in response to a start instruction.

14. The turbine fracturing device according to claim 11, wherein the idling instruction is triggered by an operation termination instruction when the fracturing pump is in the operating state.

15. The turbine fracturing device according to claim 14, wherein the operation termination instruction is inputted manually to terminate the operating state of the fracturing pump.

16. The turbine fracturing device according to claim 14, wherein the operation termination instruction is automatically triggered by a protection circuitry of the control circuitry when detecting at least one of an under-pressure of a lubricating oil of the fracturing pump or the speed reducer, or an over-temperature of the lubricating oil of the fracturing pump.

17. The turbine fracturing device according to claim 14, wherein the operation termination instruction is manually triggered via an emergency operation user interface.

18. The turbine fracturing device according to claim 11, wherein idling instruction is automatically triggered by an emergency protection circuitry of the control circuitry upon detecting at least one of an emergency under-pressure of a lubricating oil of the turbine engine, a vibration amplitude of the turbine engine being greater than a vibration threshold level, or an emergency exhaust over-temperature of the turbine engine.

19. The turbine fracturing device according to claim 11, wherein the speed reducer comprises a reduction gearbox connected with the fracturing pump through a transmission shaft.

20. The turbine fracturing device according to claim 19, wherein:
- the brake mechanism comprises a brake plate and a brake block;
- the brake block is arranged on the reduction gearbox;
- the brake plate is connected with the transmission shaft; and
- the brake block is driven by a hydraulic unit.

* * * * *